Jan. 12, 1960  A. JUNKER  2,920,841
HELICOPTER WITH BODY ATTACHING MEANS
Filed April 27, 1956
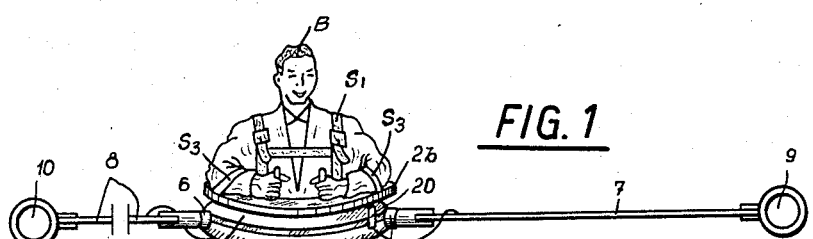
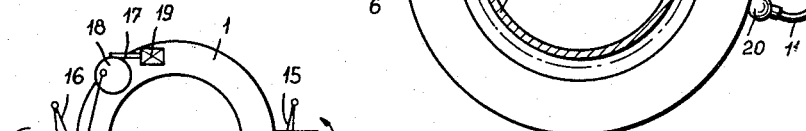
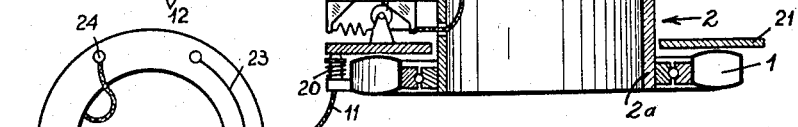
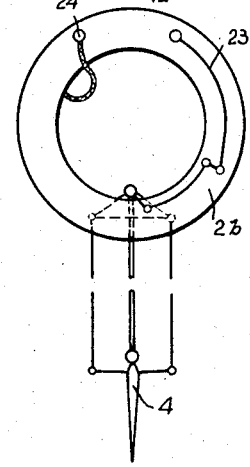
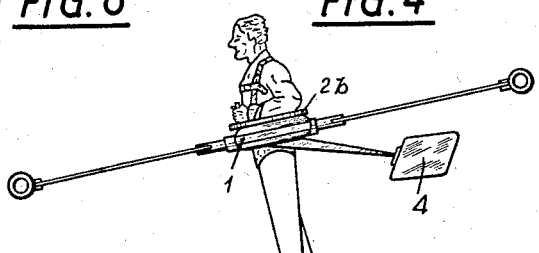
Inventor:
Arnold Junker
by: J. Delatur-ségny
Attorney United States Patent Office 2,920,841
Patented Jan. 12, 1960

2,920,841

HELICOPTER WITH BODY ATTACHING MEANS

Arnold Junker, Vesenaz-Geneva, Switzerland, assignor of one-half to Georges Borgeaud, Geneva, Switzerland Application April 27, 1956, Serial No. 581,199

6 Claims. (Cl. 244—4)

My invention relates to light helicopters of small dimensions for short range flights of one single person.

Such helicopters with their pilot placed either underneath or above the driving blades constituting the rotor are already known.

In one of these known helicopters the pilot is upright on a small platform situated above the blades.

To obtain the stability indispensable to flight, it is then necessary to dispose underneath the blades a weight lowering the centre of gravity. A position providing good conditions for the pilot is not assured.

The object of the present invention is to provide an improved helicopter for use by a single person without a cabin or seating arrangement.

According to the present invention a helicopter comprises an annular fuel reservoir rotatably mounted about a chassis provided with means for fixing to the body of a pilot, and driving blades mounted radially on opposite sides of the reservoir.

The accompanying drawings represent schematically and by way of example one embodiment of the invention.

Figure 1 is an overall view of a helicopter carried by a pilot.

Figure 2 is a view in horizontal cross section, of a circular fuel reservoir adapted to rotate on a support 2.

Fig. 3 is a vertical cross section through lines III—III of Fig. 2, showing the circular fuel reservoir and the controlling means of engine units.

Figure 4 has simply the purpose of showing the helicopter in flight with its rudder 4, and Figure 5 is a schema concerning an arrangement for varying the inclination of the blades of the helicopter.

Fig. 6 is a schema of an arrangement for actuating the rudder 4 shown on Fig. 4.

The helicopter represented in the drawings comprises an annular fuel reservoir 1 rotatably mounted about a chassis 2 provided with straps $S_1$ and $S_2$ permitting its attachment around the body of a pilot B. The chassis 2 is constituted by a cylinder 2a provided at one of its extremities with an annular flange 2b disposed in a plane perpendicular to its axis. Flange 2b is attached to the arms of the pilot by straps $S_3$ or other suitable means.

The fuel reservoir 1 is mounted on the external surface of the cylinder 2 underneath the annular flange 2b by means of a ballrace 3 which permits it to turn freely about said cylinder 2. The driving blades 7 and 8 are radially mounted in opposite directions on the reservoir 1 in two mountings 5 and 6 respectively in such a manner that they can turn about their axes. Two pulse jets 9 and 10 are mounted respectively at the extremities of the blades 7 and 8 in such a manner as to assure the rotation of the latter about the cylinder 2 as also that of the annular fuel reservoir 1 on which the blades are mounted. A flexible tube 11 permits the feeding of the fuel to the jets 9 and 10 one part of their feed conduit being embedded in the blades 7 and 8. Two spring valves 20 are provided between the reservoir 1 and the flexible tubes 11 and subjected to the action of an annular plate 21 disposed underneath the annular flange of chassis 2 for controlling the feeding of the pulse jets 9 and 10. The valves 20 rotate with the chassis 2 while the annular plate 21 is stationary but can be subjected to up and down movements by means of a cable driven actuating device 22. A rudder 4 for compensating the rotation couple and steering is mounted on the chassis 2 and is operated by a control member 23 arranged to be manually operated by the pilot on the annular flange 2b of the chassis 2, as shown schematically on Fig. 6. A member for controlling the incidence of the blades is also mounted on the annular flange 2b of the chassis 2. This control member is constituted by a tumbler switch 24 controlling a reversible electric motor 19 mounted on the reservoir 1, of which motor the shaft 17 is provided with a worm for turning in two opposite directions a toothed wheel 18 with which it engages, this toothed wheel 18 operating by means of an eccentric pivot a set of levers 12 to 16 (see Fig. 5) connected to the two blades 7 and 8. Translational flight is obtained by inclination of the rotor or by a known device permitting the realisation of a cyclic variation of the blades. The handle of the tumbler switch 24 can rotate around its axis for actuating the cable of the actuating device 22 of the annular plate 21 so that the pilot will be able to control the flight of the helicopter by merely actuating the handles of control member 23 and switch 24.

For starting the pulse-jets 9 and 10, an initial quantity of fuel is pumped into them and they are then started by means of an insufflation of compressed air as usually. The electrical sparking means and the battery for energizing the latter and the motor 19 are not shown.

What I claim is:

1. A helicopter comprising a chassis having the form of an open-ended cylinder, an annular fuel reservoir rotatably mounted about said chassis, means for fastening the latter around the waist of a pilot and driving blades mounted radially on opposite sides of said reservoir.

2. A helicopter comprising a chassis having the form of an open-ended cylinder provided with an annular flange disposed in a plane perpendicular to its axis, an annular fuel reservoir mounted in a rotatable manner on the external surface of said cylinder its upper part being covered by the annular flange, means for fastening said cylinder around the waist of a pilot and driving blades mounted radially on opposite sides of said reservoir.

3. A helicopter comprising a chassis having the form of an open-ended cylinder provided with an annular flange disposed in a plane perpendicular to its axis, an annular fuel reservoir mounted in a rotatable manner on the external surface of said cylinder its upper part being covered by the annular flange, means for attaching said annular flange to the arms of a pilot, means for attaching said cylinder around the body of the said pilot and driving blades mounted radially on opposite sides of said reservoir.

4. A helicopter comprising a chassis having the form of an open-ended cylinder provided with an annular flange disposed in a plane perpendicular to its axis, an annular fuel reservoir mounted in a rotatable manner on the external surface of said cylinder its upper part being covered by the annular flange, means for fastening said cylinder around the waist of a pilot, driving blades mounted radially on opposite sides of said reservoir in such a manner as to be rotatable around their axes, a rudder mounted on said cylinder and control means on said flange permitting on one hand to control said rudder and on the other hand to change the incidence of said driving blades.

5. A helicopter comprising a chassis having the form of an open-ended cylinder provided with an annular flange disposed in a plane perpendicular to its axis, an annular fuel reservoir mounted in a rotatable manner on the external surface of said cylinder its upper part being covered by the annular flange, means for fastening said cylinder around the waist of a pilot, driving blades mounted radially on opposite sides of said reservoir in such a manner as to be rotatable around their axes, two jet engines connected to the fuel reservoir by a tubular feed and carried by said blades on the free extremity thereof, in such a manner as to make them rotate about said cylinder, a rudder mounted on said cylinder and control means on said flange permitting on one hand to control said rudder and on the other hand to change the incidence of said driving blades.

6. A helicopter comprising a chassis in the form of an upright open-ended cylinder provided at its upper end with an annular flange disposed in a plane perpendicular to its axis, an annular fuel reservoir mounted in rotatable manner on the external surface of the chassis, its upper part being covered by the annular flange, means for fastening said chassis around the waist of a pilot, driving blades mounted radially on opposite sides of said reservoir in such a manner as to be rotatable around their axis, two pulse-jets connected to the reservoir by a tubular feed and carried by said blades on the free extremities thereof, in such a manner as to make them rotate about the chassis, a rudder mounted on the chassis and control means on the annular flange in a position accessible for the pilot with his hands.

References Cited in the file of this patent

UNITED STATES PATENTS 2,596,378    Dobbins _____ May 13, 1952
2,640,549    Isacco _____ June 2, 1953

FOREIGN PATENTS 673,964    Germany _____ Apr. 1, 1939